United States Patent
Ideshio (10) Patent No.: US 7,679,237 B2
(45) Date of Patent: Mar. 16, 2010

(54) DRIVE APPARATUS FOR ELECTRIC VEHICLE

(75) Inventor: Yukihiko Ideshio, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 329 days.

(21) Appl. No.: 11/794,908

(22) PCT Filed: Dec. 30, 2005

(86) PCT No.: PCT/IB2005/003910

§ 371 (c)(1),
(2), (4) Date: Jul. 9, 2007

(87) PCT Pub. No.: WO2006/079882

PCT Pub. Date: Aug. 3, 2006

(65) Prior Publication Data

US 2008/0088190 A1 Apr. 17, 2008

(30) Foreign Application Priority Data

Jan. 26, 2005 (JP) .............................. 2005-018331

(51) Int. Cl.
*H02K 11/00* (2006.01)
(52) U.S. Cl. ......................... 310/71; 310/179
(58) Field of Classification Search ............ 310/71, 310/89, 179, 260
See application file for complete search history.

(56) References Cited

U.S. PATENT DOCUMENTS

| | | | | |
|---|---|---|---|---|
| 3,979,615 A | * | 9/1976 | Neff | 310/71 |
| 4,181,393 A | * | 1/1980 | Lill | 439/402 |
| 4,476,407 A | * | 10/1984 | Hildebrandt et al. | 310/71 |
| 4,585,964 A | | 4/1986 | Hildebrandt et al. | |
| 5,500,563 A | * | 3/1996 | Kawaguchi et al. | 310/71 |
| 2004/0266270 A1 | | 12/2004 | Miyazaki | |
| 2007/0138882 A1 | * | 6/2007 | Tsukashima et al. | 310/71 |
| 2007/0296290 A1 | * | 12/2007 | Tsukashima et al. | 310/71 |

FOREIGN PATENT DOCUMENTS

| | | |
|---|---|---|
| EP | 0 029 328 A | 5/1981 |
| EP | 0 615 332 A | 9/1994 |
| JP | U-05-095161 | 3/1992 |
| JP | A-06-022495 | 7/1992 |
| JP | 05-219674 A | 8/1993 |

(Continued)

*Primary Examiner*—Thanh Lam
(74) *Attorney, Agent, or Firm*—Kenyon & Kenyon LLP (57) ABSTRACT

A drive apparatus for an electric vehicle includes a rotating electric device; a power source; and a terminal block. The rotating electric device drives the wheels of the vehicle. Electric power is supplied to the rotating electric device from the power source through a power-supply passage connected to the rotating electric device through the terminal block, which is fitted to the rotating electric device. The rotating electric device also includes a housing; a stator provided within the housing; and a coil-end positioned at the end of the stator in the axial direction. The terminal block is disposed near the coil-end at a position equal to or lower than the top surface of the housing. The terminal block is fitted to the rotating electric device so that the terminal block is electrically connected to the coil-end, by inserting the terminal block from the side surface of the housing.

14 Claims, 6 Drawing Sheets

FOREIGN PATENT DOCUMENTS

| | | |
|---|---|---|
| JP | A-06-351184 | 12/1994 |
| JP | A-07-075282 | 3/1995 |
| JP | A-08-214492 | 8/1996 |
| JP | A-2002-208456 | 7/2002 |
| JP | A-2005-229754 | 8/2005 |
| WO | WO 2005/029681 A1 | 3/2005 |

* cited by examiner

DRIVE APPARATUS FOR ELECTRIC VEHICLE

This is a 371 national phase application of PCT/IB2005/003910 filed 30 Dec. 2005, claiming priority to Japanese Patent Application No. 2005-018331 filed 26 Jan. 2005, the contents of which are incorporated herein by reference.

BACKGROUND OF THE INVENTION

1. Field of the Invention

The invention relates to a drive apparatus for an electric vehicle. More particularly, the invention relates to a drive apparatus for an electric vehicle, which drives an axle using a rotating electric device.

2. Description of the Related Art

Rotating electric devices generally include a stator, a rotor and a contact terminal to which a power-supply cable is connected. Electric power from an external power source is supplied to the rotating electric device through the power-supply cable. Japanese Utility Model Application Publication No. 5-95161 describes a motor (rotating electric device) where a terminal block is provided on the outer periphery of a stator-core.

Compact rotating electric devices are described in Japanese Patent Application Publications No. JP-A-6-22495, No. JP-A-6-351184, and No. JP-A-7-75282.

In Japanese Patent Application Publication No. JP-A-8-214492 a rotating electric device where the power-supply cable extends through the side wall of a housing, and connects to the winding wire of a stator via a terminal block is described. Japanese Patent Application Publication No. JP-A-2002-208456 describes a configuration where the connection between a shielding wire and a terminal is sealed with a seal ring fitted to the shielding wire.

In such rotating electric devices, the positioning of the terminal block is important. For example, when the terminal block is positioned outside of the outer periphery of the stator in the radial direction, the height of the entire rotating electric device (i.e., the length in the radial direction of the stator) is increased. However, due to space constraints in a vehicle, there is a limit to the maximum height of the entire rotating electric device that can still fit in the vehicle. Therefore, the diameter of the stator should be reduced so that the increase in the height of the entire rotating electric device, due to the provision of the terminal block, is kept to a minimum. However, reducing the diameter of the stator decreases the output of the rotating electric device.

Also, from another viewpoint, the stator and the rotor inserted in the stator are required to be disposed at higher positions than those in the conventional cases to reduce the agitation resistance caused by oil agitated in the housing when the rotor is rotated.

None of the publications mentioned above addresses the aforementioned problems.

SUMMARY OF THE INVENTION

It is an object of the invention to provide a drive apparatus for an electric vehicle, which can be easily installed in a vehicle.

According an aspect of the invention, a drive apparatus for an electric vehicle includes a rotating electric device; a power source; and a terminal block. The rotating electric device drives the wheels of the vehicle. Electric power is supplied to the rotating electric device from the power source through a power-supply passage connected to the rotating electric device through the terminal block, which is fitted to the rotating electric device. The rotating electric device also includes a housing; a stator provided within the housing; and a coil-end positioned at the end of the stator in the axial direction. The terminal block is disposed near the coil-end at a position equal to or lower than the top surface of the housing. The terminal block is fitted to the rotating electric device so that the terminal block is electrically connected to the coil-end, by inserting the terminal block from the side surface of the housing.

With the aforementioned configuration, the height of the rotating electric device housing can be reduced, and the rotating electric device can be installed in a vehicle more easily. Also, the increase in the outer diameter of the rotating electric device can be easily minimized.

The aforementioned drive apparatus for an electric vehicle may further include a first terminal included in the terminal block; and a second terminal, included in the rotating electric device, that protrudes in the axial direction of the stator. The first terminal may be fitted to the second terminal by inserting the terminal block from the side surface of the housing along the axial direction of the stator thereby electrically connecting the terminal block to the coil-end.

With the aforementioned configuration, even if the axial length of the stator is changed, the shapes of the first terminal and the second terminal do not need to be changed. As a result, the number of additional components that may be needed in the rotating electric device is minimized.

In the aforementioned drive apparatus for an electric vehicle, space between the terminal block and the housing may be sealed with a seal member; the terminal block may be electrically connected to the coil-end by fitting the first terminal to the second terminal; and the fitting-depth of the second terminal within the first terminal may be greater than the insertion-depth of the seal member.

The above configuration forms a more secure seal in the rotating electric device. Also, when the terminal block is fitted, the seal portion is fitted after the initial stage of the process for fitting the first terminal to the second terminal is completed. Therefore, fitting of the first terminal to the second terminal can be easily detected.

One aspect of the invention provides a compact drive apparatus for an electric vehicle. Also, the drive apparatus can be installed in the vehicle easily, and the output of the drive apparatus can be improved.

BRIEF DESCRIPTION OF THE DRAWINGS

The above mentioned and other features, advantages, technical and industrial significance of this invention will be better understood by reading the following detailed description of example embodiments of the invention, when considered in connection with the accompanying drawings, in which.

DETAILED DESCRIPTION OF THE EXAMPLE EMBODIMENTS

Hereinafter, a drive apparatus for an electric vehicle according to an example embodiment of the invention will be described. The same or corresponding portions are denoted by the same reference numerals, and redundant description thereof will be omitted.

Figure 1:
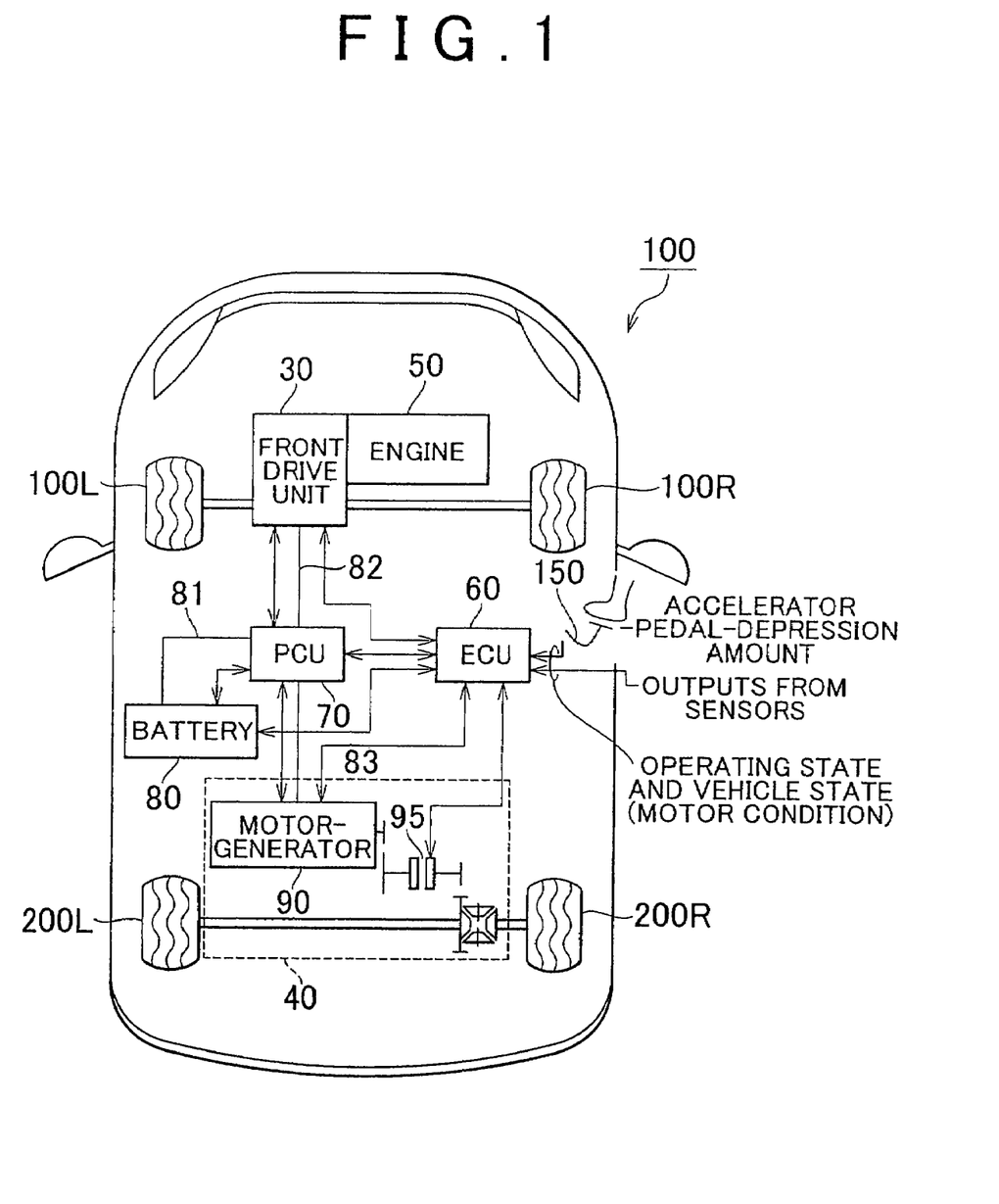
FIG. 1 is a block diagram showing the configuration of a vehicle that includes a drive apparatus for an electric vehicle according to an example embodiment of the invention.

FIG. 1 shows a block diagram of the configuration of a vehicle that includes the drive apparatus for an electric vehicle according to the embodiment of the invention.

As shown in FIG. 1, a vehicle 100 according to the embodiment includes front wheels 100L and 100R; rear wheels 200L and 200R; a front drive unit 30 that drives the front wheels; a rear drive unit 40 that drives the rear wheels; an engine 50; an electronic control unit (hereinafter, referred to as "ECU") 60, a power control unit (hereinafter, referred to as "PCU") 70; and a battery 80.

The rear drive unit 40 includes a rear motor-generator 90 and a clutch 95. When the rear motor-generator 90 drives the rear wheels 200L and 200R, it functions as a motor. The clutch 95 is provided between the rear motor-generator 90 and the axle connected to the rear wheels 200L and 200R.

When the clutch 95 is engaged, torque generated by the rear motor-generator 90 is transmitted to the axle to drive the rear wheels 200L and 200R. However, the rear wheels 200L and 200R may also rotate the rear motor-generator 90, for example, during deceleration, in which case the rear motor-generator 90 then functions as a generator.

The front drive unit 30 includes a motor for driving the front wheels (not shown). Generally, the engine 50 drives the front wheels 100L and 100R. However, the front wheels 100L and 100R may also be driven using torque generated by the motor instead of or in addition to the engine 50. As with the rear motor-generator 90, when the motor is rotated by the front wheels 100L and 100R or the engine 50, the motor functions as a generator.

The ECU 60 serves as a "control device". The ECU 60 receives information on the operating state and vehicle state from sensors, such as the accelerator-pedal depression amount and the accelerator-pedal depression speed detected by a position sensor provided in an accelerator pedal 150. The information on the operating state includes the output from a vehicle-wheel speed sensor and the output from a vehicle-body inclination sensor, as well as the output from the accelerator-pedal position sensor. Further, the information on the vehicle state includes information on the operating condition of the rear motor-generator 90, such as the outputs from a temperature sensor, an electric current sensor, a speed sensor, and the like provided in the rear motor-generator 90. On the basis of the information, the ECU 60 executes controls for the vehicle 100.

The PCU 70 is a set of electric-power converters required in the vehicle 100. The PCU 70 includes an inverter (not shown) that converts DC electric power to AC electric power and a DC-DC converter (not shown) that changes the voltage level of the DC electric power. In particular, the inverter converts DC electric power supplied from the battery 80 to AC electric power for driving the motor-generator 90. Also, when the engine 50 drives the motor-generator to generate electric power, or when the motor-generator generates electric power through regenerative braking, the inverter converts the generated AC electric power to DC electric power for charging the battery 80. The DC-DC converter is used mainly to change the DC voltage to the level appropriate for the power source for auxiliary devices and accessories, such as an air conditioner.

The battery 80 is connected to the PCU 70 through a power-supply cable 81. The front drive unit 30 and the rear drive unit 40 are connected to the PCU 70 through power-supply cables 82 and 83, respectively. Electric power is transmitted through the power-supply cables 81, 82 and 83.

In this embodiment, the front wheels 100L and 100R of the vehicle 100 are driven by the front drive unit 30 (in a front-wheel drive mode). However, when the vehicle takes off, the vehicle is suddenly accelerated, or the vehicle runs on a road with low friction coefficient, the vehicle is driven by four wheels (in a four-wheel drive mode) to stably distribute drive torque.

When the vehicle is driven in four-wheel drive mode, a flag indicating that the clutch 95 should be engaged is turned ON in the ECU 60, and the clutch 95 is engaged according to the flag. This allows torque output from the rear motor-generator 90 to be transmitted to the rear wheels 200L and 200R. As a result, the rear wheels 200L and 200R are driven as well as the front wheels 100L and 100R. Also, when the vehicle decelerates or when the brakes are applied, the clutch 95 is engaged to operate the rear motor-generator 90 as the generator and to recover energy for charging the battery 80.

Figure 2:
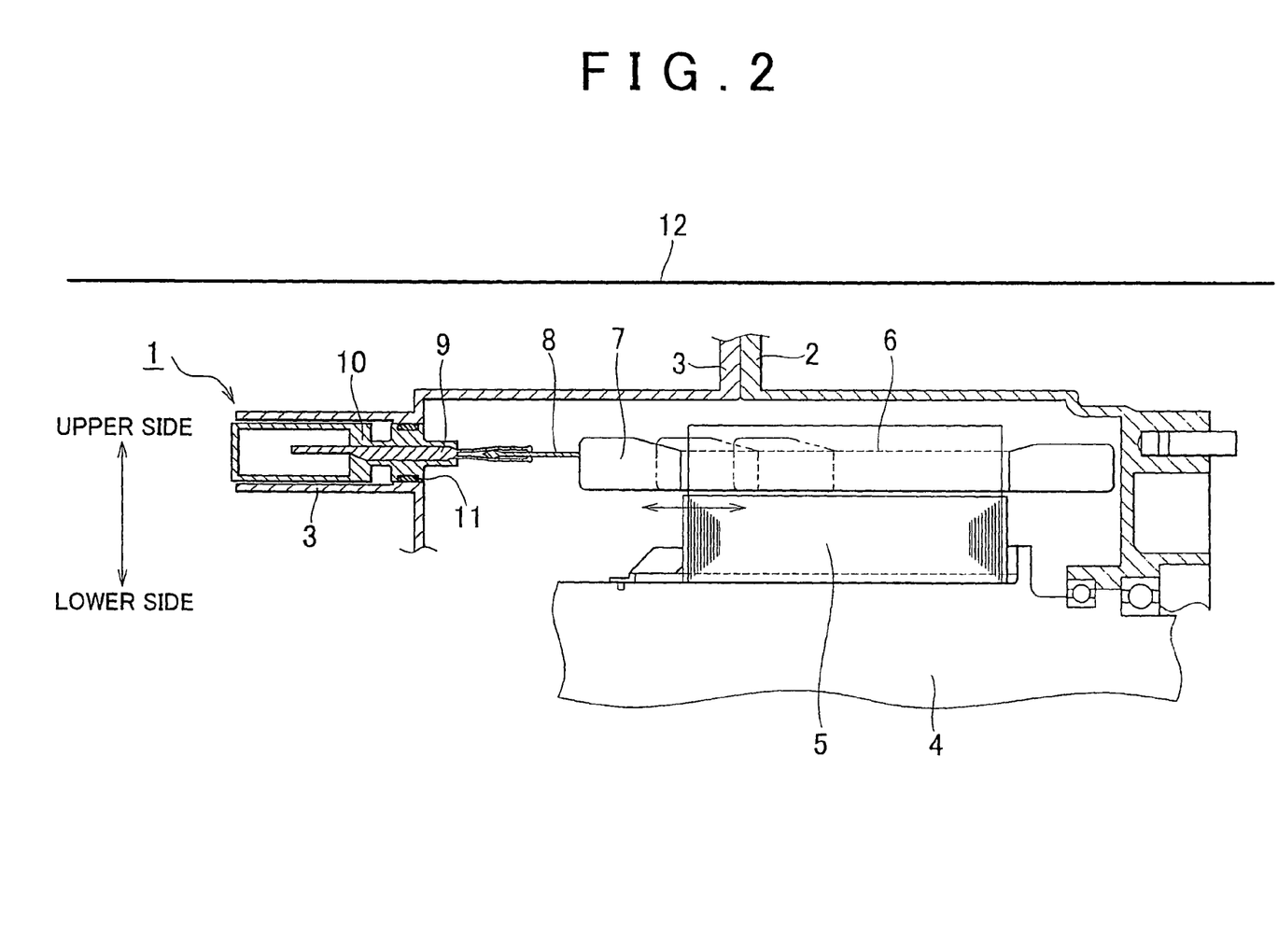
FIG. 2 is a cross sectional view showing a rotating electric device of the drive apparatus for an electric vehicle according to the embodiment of the invention.

FIG. 2 is a cross sectional view showing a rotating electric device 1 of the drive apparatus for an electric vehicle according to the embodiment.

For example, the rotating electric device 1 is used as the rear motor-generator 90 in the vehicle shown in FIG. 1. In this case, the rotating electric device 1 is connected to the PCU 70 via a power-supply cable 83. The power-supply cable 83 is connected to a terminal block 10. Electric power is supplied to the rotating electric device 1 through the power-supply cable 83 (refer to FIG. 1).

As shown in FIG. 2, the rotating electric device 1 includes a housing, which includes a case 2 and a cover 3. The case 2 supports one end of a rotating shaft 4 via a bearing. The cover 3 supports the other end of the rotating shaft 4 via a bearing. The rotating electric device 1 includes a rotor and a stator.

The rotor includes a rotor-core 5 fitted to the rotating shaft 4. Permanent magnets (not shown) are buried in the rotor-core 5. The rotor-core 5 is made of magnetic material such as iron or iron alloy. The permanent magnets are disposed at substantially equal intervals near the outer periphery thereof.

The stator includes a stator-core 6 having a ring shape. The stator is made of magnetic material such as iron or iron alloy. A plurality of teeth (not shown) are formed on the inner peripheral surface of the stator-core 6. Also, a plurality of slots (not shown) are formed on the inner peripheral surface of the stator-core 6. The slots are grooves formed between the teeth. The slots open to the inner periphery of the stator-core 6.

Stator winding wires, which include a U-phase winding wire, a V-phase winding wire, and a W-phase winding wire, are wound around the teeth such that the stator winding wires are fitted in the slots. The U-phase winding wire, the V-phase winding wire, and the W-phase winding wire are offset from each other in the circumferential direction.

A coil-end 7 of the stator winding wires is connected to a busbar 8. The busbar 8 is fitted into a terminal 9 provided in the terminal block 10 so that the coil-end 7 is electrically connected to the terminal block 10. The terminal block 10 includes a seal member that seals the space between the terminal 10 and the cover 3 using the O-ring 11 in a terminal block-installation portion. The terminal block 10 is connected to a power-supply passage (for example, the power-supply cable 83 in FIG. 1).

As shown in FIG. 2, the rotating electric device 1 is provided under a floor 12 of the vehicle. The terminal block 10 is disposed at a position equal to or lower than the top surface of the housing (cover 3) of the rotating electric device 1. The terminal block 10 is fitted to the rotating electric device 1 by inserting the terminal block 10 from the side surface of the housing (cover 3).

The busbar 8 protrude from the coil-end 7 in the lateral direction (i.e., the direction where the stator-core 6 extends). The terminal 9 protrudes from the terminal block 10 in the lateral direction (i.e., the direction where the stator-core 6 extends). The terminal block 10 is inserted from the side surface of the cover 3 in the lateral direction.

The configuration of the rotating electric device 1 may be changed as needed to fit the configuration of the vehicle where the rotating electric device 1 is installed. That is, the axial lengths of the rotor-core 5 and the stator-core 6 may be changed (as shown, for example, by the arrow in FIG. 2) when necessary. As a result, the coil-end 7 may be positioned in areas indicated by two-dot chain lines in FIG. 2.

Because the busbar 8 and the terminal 9 having the aforementioned shapes are employed, only the shape of the cover 3 needs to be changed if the coil-end 7 is moved due to the change in the axial length of the stator-core 6. That is, the rotating electric device 1 can be formed without changing the shapes of the busbar 8, the terminal 9, and the terminal block 10. This reduces the number of additional components needed.

The terminal 9 includes a receptacle, which faces the busbar 8. The busbar 8 is fitted into the receptacle so that the busbar 8 is electrically connected to the terminal 9. To allow the busbar 8 to be easily fitted into the terminal 9, the end of the busbar 8 is a tapered point, and the terminal 9 has an end with a curved surface (for example, a circular end). Typically, the terminal 9 is composed of a leaf spring. However, the terminal 9 may be made of thermosetting material. The busbar may be formed with a receptacle that faces the terminal. In this case, the terminal would be fitted into the receptacle of the busbar so that the terminal is electrically connected to the busbar. Also, the receptacle may have a concave shape.

Because the busbar 8 and the terminal 9 have the aforementioned configurations, the busbar 8 does not need to be joined to the terminal 9 by a bolt. This eliminates the need to provide a cover for the area where the busbar 8 is joined to the terminal 9. This reduces the number of components of the rotating electric device 1, and the man-hours required to produce the rotating electric device 1.

Figure 3:
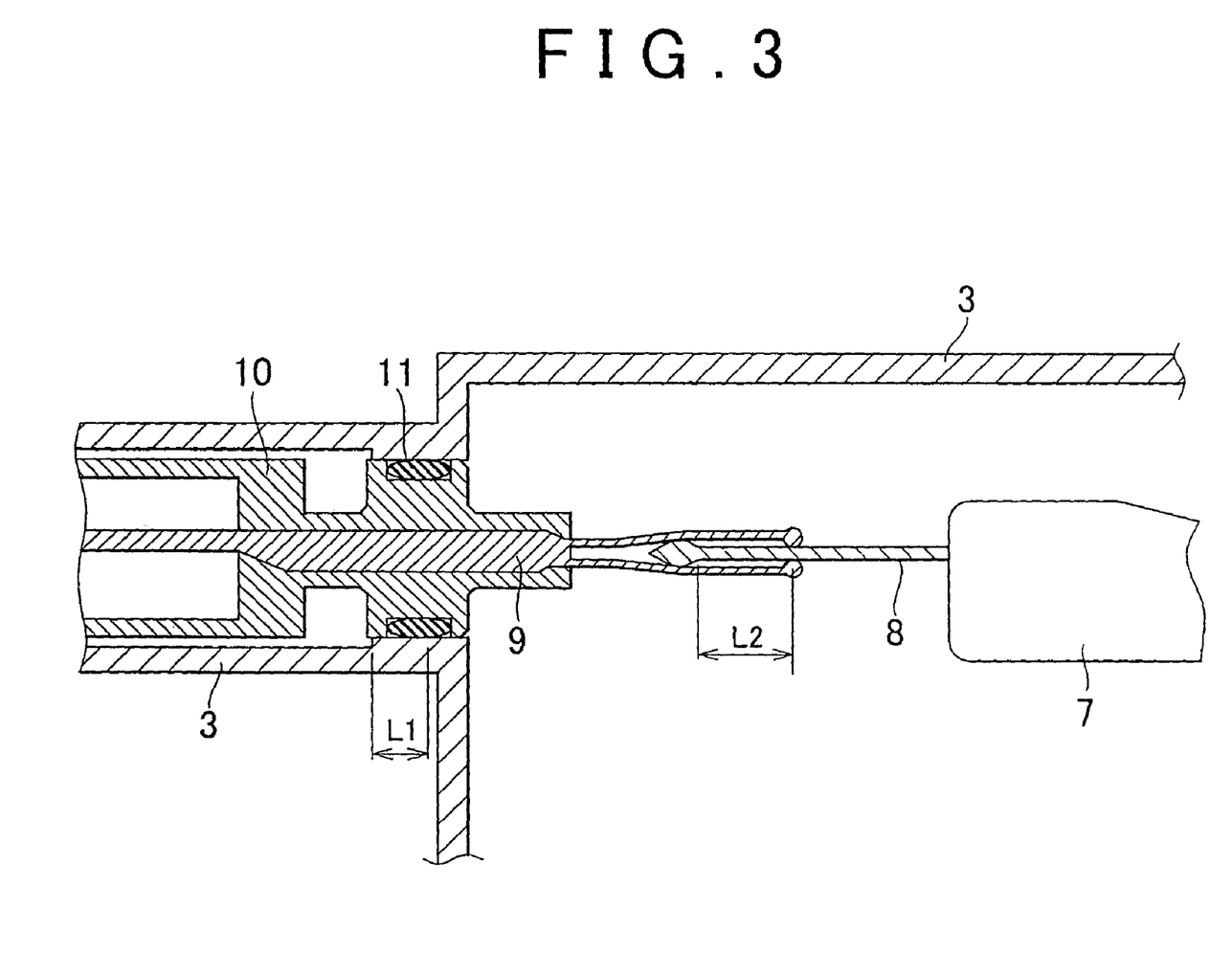
FIG. 3 is an enlarged cross sectional view showing the area of the rotating electric device shown in FIG. 2, where a terminal is joined to a busbar.

FIG. 3 is an enlarged cross sectional view of the area of the rotating electric device 1, where the busbar 8 is joined to the terminal 9.

As shown in FIG. 3, the fitting-depth of the busbar 8 within the terminal 9 (indicated by L2 in FIG. 3) is longer than the insertion-depth of the seal portion (indicated by L1 in FIG. 3). The term "the seal portion" refers to the area where the O-ring 11 is pressed against the cover 3. The term "the insertion-depth of the O-ring" signifies the distance from the O-ring 11 to the edge of the flange portion 3A of the cover 3 (refer to FIG. 5). The position of the seal portion is determined based on the diameter of the O-ring or the like, substantially uniformly.

Figure 4:
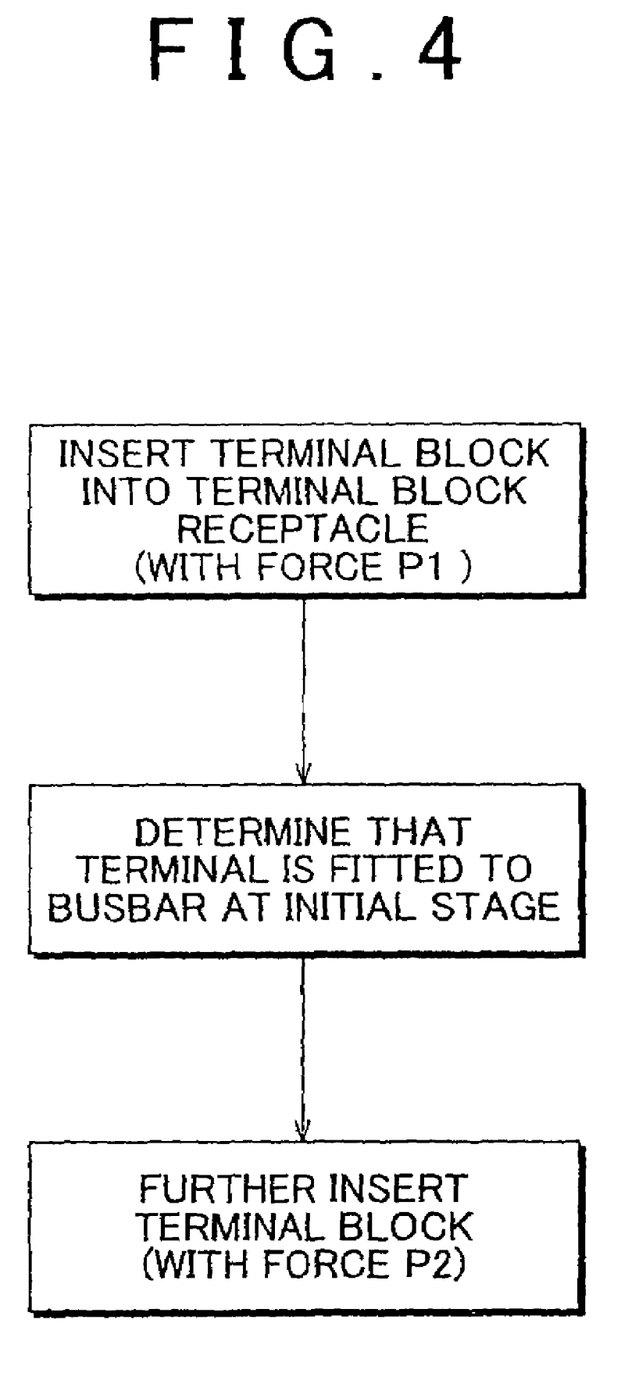
FIG. 4 is a diagram showing the process for fitting the terminal block to the rotating electric device shown in FIG. 2.
Figure 5:
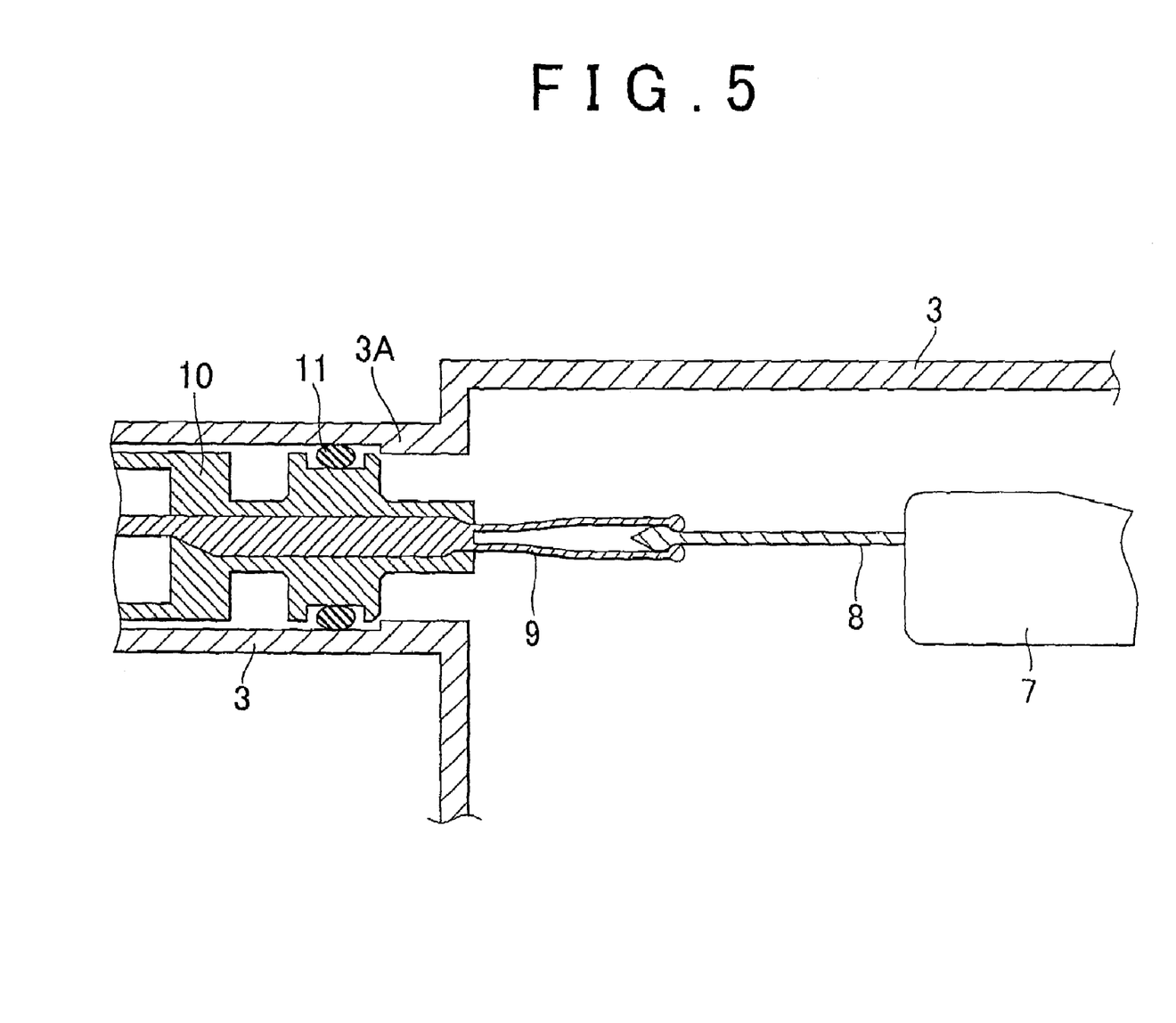
FIG. 5 is a diagram showing a step in the process shown in FIG. 4.

FIG. 4 shows the process for fitting the terminal block 10 to the rotating electric device 1. FIG. 5 is a diagram showing a step in the process shown in FIG. 4. Hereinafter, the effect of making L2 longer than L1 will be described with reference to FIG. 4 and FIG. 5.

As shown in FIG. 4, first, the terminal block 10 is inserted into a terminal block receptacle of the cover 3 (with a force P1). The terminal 10 is inserted to an installation position shown in FIG. 3 from the left side to the right side in FIG. 3. Thus, the busbar 8 is fitted to the terminal 9. FIG. 5 shows the initial stage of fitting the busbar 8 to the terminal 9. Initially, the O-ring 11 does not contact the flange portion 3A of the cover 3. Accordingly, transition from the state where the busbar 8 does not contact the terminal 9 to the state where the busbar 8 is fitted to the terminal 9 at the initial stage can be easily determined. The term "fitting-depth" signifies the distance that the busbar 8 is moved in a receptacle of the terminal 9 by inserting the terminal block to the installation position shown in FIG. 3, after the busbar 8 is fitted to the terminal 9 at the initial stage.

After it is determined that the busbar 8 is fitted to the terminal 9 at the initial stage, the terminal block 10 is pushed with additional force (with a force P2). At this step, the seal portion needs to be formed by pressing the O-ring 11 against the wall of the flange portion 3A. Therefore, the force P2 is greater than the force P1 used in the previous step (i.e., P2>P1).

Because L2 has a greater length than L1, as described above, the positioning of the busbar 8 and the terminal 9 (i.e., the initial stage) can be completed before the O-ring 11 closely contacts the cover 3. Thus, fitting of the busbar 8 to the terminal 9 can be easily detected.

Figure 6:
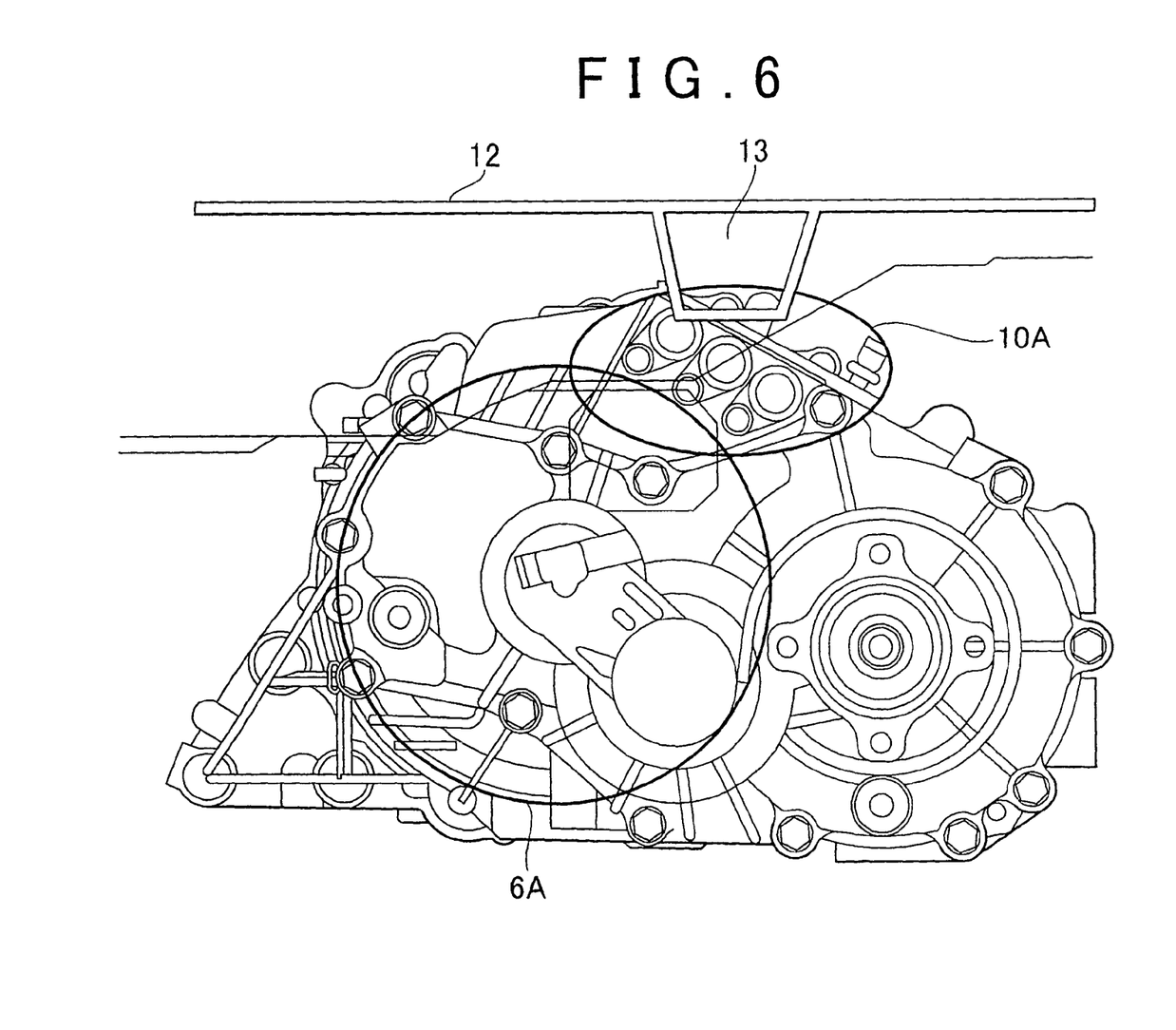
FIG. 6 is a lateral view showing a rotating electric device according to a reference example.

FIG. 6 is a side view showing a rotating electric device according to a reference example.

In FIG. 6, a terminal block-installation portion 10A is provided outside of the outer periphery 6A of the stator in the radial direction. As a result, the rotating electric device interferes with a cross member 13 of the floor 12. However, reducing the outer periphery 6A of the stator as shown in FIG. 6 in order to minimize this interference is not desirable, because of the adverse effect it would have on the output of the rotating electric device 1.

Meanwhile, in the drive apparatus for an electric vehicle according to the embodiment, with the aforementioned configuration, the height of the housing of the rotating electric device 1 can be reduced, which facilitates installation of the rotating electric device into the vehicle. Another consequence of the reduced height is that the increase in the outer diameter of the rotating electric device can be kept to a minimum. Further, from another viewpoint, because the terminal block is disposed at the position equal to or lower than the top surface of the housing, the rotor shaft can be disposed at a higher position than the rotor shafts in the conventional cases. As a result, the position of the rotor shaft may be moved upward with respect to the level of oil present in the housing. Therefore, the drag on the rotor that would be caused by the agitation of oil when the rotor is rotated can be significantly reduced. Also, the amount of oil agitated by the rotor is reduced. Therefore, an oil sump with a smaller capacity can be used, which reduces the size of the drive apparatus.

The above description can be summarized as follows.

The drive apparatus for an electric vehicle according to the embodiment includes the rotating electric device 1 (motor-generator 90); the power source (battery 80); and the terminal block 10. The rotating electric device 1 (motor-generator 90) drives the vehicle wheels. The power source (battery 80) supplies electric power to the rotating electric device 1. The terminal block 10 is fitted to the rotating electric device 1, and is connected to the power-supply passage (power-supply cable 83). Electric power is supplied to the rotating electric device 1 from the power source through the power-supply passage (power-supply cable 83). The rotating electric device 1 includes the housing, which includes the case 2 and the cover 3; the stator-core 6 provided in the housing; and the coil-end 7 positioned at the end of the stator-core 6 in the axial direction. The terminal block 10 is disposed near the coil-end 7 at the position equal to or lower than the top surface of the housing. The terminal block 10 is fitted to the rotating electric device 1 so that the terminal block 10 is electrically connected to the coil-end 7, by inserting the terminal block 10 from the side surface of the housing.

Also, the terminal block 10 includes the terminal 9 (first terminal). The rotating electric device 1 includes the busbar 8 (second terminal) that protrudes in the axial direction of the stator-core 6. The terminal block 10 is fitted to the rotating electric device 1 by inserting the terminal block 10 into the housing in the axial direction of the stator-core 6.

Also, the terminal block 10 includes the seal portion that seals the space between the terminal 10 and the housing using the O-ring 11. By fitting the busbar 8 into the terminal 9, the terminal 10 is electrically connected to the coil-end 7. The fitting-depth (L2) of the busbar 8 within the terminal 9 is longer than the insertion-depth (L1) of the seal portion.

Thus, the embodiment of the invention that has been disclosed in the specification is to be considered in all respects as illustrative and not restrictive. The technical scope of the invention is defined by claims, and all changes which come within the meaning and range of equivalency of the claims are therefore intended to be embraced therein.

The invention claimed is:

1. A drive apparatus for an electric vehicle, comprising:
    a rotating electric device which includes a housing, a stator provided in the housing, and a coil-end positioned at an end of the stator in an axial direction, and which drives wheels of the vehicle;
    a power source that supplies electric power to the rotating electric device;
    a power-supply passage through which electric power is supplied to the rotating electric device from the power source; and
    a terminal block to which the power supply passage is connected, wherein the terminal block is disposed near the coil-end at a position equal to or lower than a top surface of the housing, and is fitted to the rotating electric device so that the terminal block is electrically connected to the coil-end by inserting the terminal block from a side surface of the housing.

2. The drive apparatus for an electric vehicle according to claim 1, wherein the terminal block is fitted to the rotating electric device along the axial direction of the stator.

3. The drive apparatus for an electric vehicle according to claim 1, further comprising:
    a first terminal included in the terminal block; and
    a second terminal, included in the rotating electric device, that protrudes in the axial direction of the stator, wherein the first terminal is fitted to the second terminal by inserting the terminal block from the side surface of the housing along the axial direction of the stator thereby electrically connecting the terminal block to the coil-end.

4. The drive apparatus for an electric vehicle, according to claim 3, wherein the first terminal is composed of a leaf spring.

5. The drive apparatus for an electric vehicle, according to claim 3, wherein the first terminal is made of a thermosetting material.

6. The drive apparatus for an electric vehicle according to claim 3, wherein an end of the first terminal includes a receptacle which faces the second terminal.

7. The drive apparatus for an electric vehicle, according to claim 6, wherein an end of the receptacle of the first terminal has a curved surface to facilitate insertion of the second terminal.

8. The drive apparatus for an electric vehicle, according to claim 6, wherein the second terminal is a busbar that can be fitted into the receptacle at the end of the first terminal, thereby electrically connecting the first terminal and the second terminal.

9. The drive apparatus for an electric vehicle, according to claim 8, wherein the end of the busbar is tapered to facilitate insertion into the receptacle at the end of the first terminal.

10. The drive apparatus for an electric vehicle according to claim 1, further comprising a seal member, included in the terminal block, that seals a space between the terminal block and the housing.

11. The drive apparatus for an electric vehicle according to claim 10, wherein the seal member is an O-ring.

12. The drive apparatus for an electric vehicle according to claim 10, wherein a fitting-depth of the second terminal within the first terminal is greater than an insertion-depth of the seal member.

13. The drive apparatus for an electric vehicle according to claim 10, wherein the seal member contacts a flange portion of the housing such that the seal member and the flange portion of the housing constitutes a seal portion, after the first terminal contacts the second terminal, when the terminal block is inserted in the housing.

14. The drive apparatus for an electric vehicle according to claim 1, wherein the terminal block is disposed within the housing.

* * * * *